United States Patent
Xu et al.

(10) Patent No.: US 12,129,362 B2
(45) Date of Patent: *Oct. 29, 2024

(54) ANTI-AGING POLAR RUBBER COMPOSITION, PROCESSING METHOD THEREFOR AND APPLICATION THEREOF

(71) Applicants: HANGZHOU XINGLU TECHNOLOGIES CO., LTD., Zhejiang (CN); ZHEJIANG UNIVERSITY, Zhejiang (CN)

(72) Inventors: Tao Xu, Hangzhou (CN); Zhi Sheng Fu, Hangzhou (CN); An Yang Wu, Hangzhou (CN)

(73) Assignees: HANGZHOU XINGLU TECHNOLOGY CO., LTD., Zhejiang (CN); ZHEJIANG UNIVERSITY, Zhejiang (CN)

(*) Notice: Subject to any disclaimer, the term of this patent is extended or adjusted under 35 U.S.C. 154(b) by 783 days.

This patent is subject to a terminal disclaimer.

(21) Appl. No.: 17/259,925

(22) PCT Filed: Jun. 25, 2019

(86) PCT No.: PCT/CN2019/092643
§ 371 (c)(1),
(2) Date: Jan. 12, 2021

(87) PCT Pub. No.: WO2020/011004
PCT Pub. Date: Jan. 16, 2020

(65) Prior Publication Data
US 2021/0292527 A1 Sep. 23, 2021

(30) Foreign Application Priority Data
Jul. 13, 2018 (CN) .......................... 201810771307.X

(51) Int. Cl.
| | |
|---|---|
| *C08L 23/06* | (2006.01) |
| *C08L 23/08* | (2006.01) |
| *C08L 23/16* | (2006.01) |
| *C08L 23/22* | (2006.01) |
| *C08L 23/28* | (2006.01) |
| *C08K 3/013* | (2018.01) |
| *C08K 5/00* | (2006.01) |
| *C08K 5/09* | (2006.01) |

(52) U.S. Cl.
CPC .......... *C08L 23/06* (2013.01); *C08L 23/0815* (2013.01); *C08L 23/16* (2013.01); *C08L 23/22* (2013.01); *C08L 23/286* (2013.01); *C08K 3/013* (2018.01); *C08K 5/0016* (2013.01); *C08K 5/005* (2013.01); *C08K 5/0066* (2013.01); *C08K 5/09* (2013.01); *C08L 2203/206* (2013.01)

(58) Field of Classification Search
CPC .... C08L 23/06; C08L 23/0815; C08L 23/286; C08L 23/0892; C08L 53/00; C08L 23/283; C08L 23/22; C08L 23/20; C08K 3/04; C08K 3/22; C08K 5/09
See application file for complete search history.

(56) References Cited

U.S. PATENT DOCUMENTS

| | | | |
|---|---|---|---|
| 10,059,815 B2 | 8/2018 | Soisson et al. | |
| 11,472,948 B2 * | 10/2022 | Xu | ............... C09J 123/0853 |
| 2012/0251751 A1 | 10/2012 | Blume et al. | |
| 2013/0022770 A1 * | 1/2013 | Daiss | ................. C08F 30/08 |
| | | | 428/221 |

FOREIGN PATENT DOCUMENTS

| | | |
|---|---|---|
| CN | 101016360 A | 8/2007 |
| CN | 102731915 A | 10/2012 |
| CN | 103980596 A | 8/2014 |
| CN | 105164193 A | 12/2015 |

(Continued)

OTHER PUBLICATIONS

Zeng et al., electronic translation of CN 109824948 (May 2019).*
SIPO, International Search Report issued in IA No. PCT/CN2019/092643, mailed Sep. 30, 2019.

*Primary Examiner* — Mark S Kaucher
(74) *Attorney, Agent, or Firm* — LKGlobal | Lorenz & Kopf, LLP

(57) ABSTRACT

Disclosed by the present invention are an anti-aging polar rubber composition, a processing method therefor and an application thereof. The rubber composition comprises: a rubber matrix and a compounding component. In parts by weight, every 100 parts of the rubber matrix comprise 0-99 parts of highly branched polyethylene P1, 0-100 parts of P2, which is a reactant of the highly branched polyethylene P1 and a polar monomer, 0-50 parts of P3, which is a reactant of a copolymer of ethylene and α-olefin and a polar monomer, and 0-50 parts of P4, which is a reactant of a binary, ternary or higher multipolymer of mono-olefin and diene monomer and a polar monomer, and the sum of the contents of P1 and P2 is 50-100 parts; and P1 is an ethylene homopolymer with a branched structure, and has a branching degree of not less than 50 branches/1000 carbons; and the compounding component comprises a vulcanization system. Provided by the present invention is a rubber composition with both aging resistance and certain polarity, which expand the usage range of highly branched polyethylene as an elastomer, and is more suitable for applications with requirements for polarity-related performance such as adhesion performance and oil resistance.

20 Claims, No Drawings

(56) References Cited

FOREIGN PATENT DOCUMENTS

| | | | |
|---|---|---|---|
| CN | 106478848 A | | 3/2017 |
| CN | 106519087 A | | 3/2017 |
| CN | 106589181 A | | 4/2017 |
| CN | 107099099 A | | 8/2017 |
| CN | 108299745 A | | 7/2018 |
| CN | 108359179 A | | 8/2018 |
| CN | 109824948 | * | 5/2019 |
| EP | 1870434 A2 | | 12/2007 |

* cited by examiner

ANTI-AGING POLAR RUBBER COMPOSITION, PROCESSING METHOD THEREFOR AND APPLICATION THEREOF

CROSS REFERENCE TO RELATED APPLICATIONS

The present application is the U.S. national phase of and claims priority to International Patent Application No. PCT/CN2019/092643 filed Jun. 25, 2019, which claims the benefit of priority from China National Application No. 201810771307.X, filed on Jul. 13, 2018.

TECHNICAL FIELD

The present invention belongs to the technical field of rubber, and particularly relates to an anti-aging polar rubber composition, a processing method therefor and an application thereof.

RELATED ART

Highly branched polyethylene is an elastomer obtained by homopolymerization of ethylene, is relatively low in raw material cost, has excellent aging resistance as a polyolefin elastomer with saturated molecular chains, and can be applied to various fields of sealing elements, electric wires and cables, waterproof rolls, heat-resistant conveyor belts, heat-resistant rubber hoses, and the like. However, the highly branched polyethylene contains only carbon and hydrogen elements in its molecular structure and is completely saturated, so it is a nonpolar material, and has poor performance related to polarity such as adhesion performance, oil resistance, dyeing performance, flame retardance, blending compatibility with polar materials, which limits its application range.

SUMMARY

By aiming at the problems in the prior art, the present invention provides an anti-aging polar rubber composition based on highly branched polyethylene. A rubber matrix of the composition at least includes polarization modified highly branched polyethylene and one of other anti-aging elastomers with polarity and good compatibility with the highly branched polyethylene, so that the rubber composition has good anti-aging performance and a certain polarity on the whole, thus effectively broadening the application range of the highly branched polyethylene.

In order to achieve the above objective, the present invention adopts the following technical solution: a rubber composition includes a rubber matrix and a compounding component. In parts by weight, every 100 parts of said rubber matrix comprise: 0-99 parts of highly branched polyethylene P1, 0-100 parts of P2, which is a reactant of the highly branched polyethylene P1 and a polar monomer, 0-50 parts of P3, which is a reactant of a copolymer of ethylene and α-olefin and a polar monomer, and 0-50 parts of P4, which is a reactant of a binary, ternary or higher multipolymer of mono-olefin and diene monomer and a polar monomer, and the sum of the contents of P1 and P2 is 50-100 parts; and the sum of the contents of P2, P3 and P4 is not less than 3 parts. P1 is an ethylene homopolymer with a branched structure, and the branching degree of P1 is not less than 50 branches/1000 carbons. The compounding component includes a vulcanization system.

The highly branched polyethylene used in the present invention is an ethylene homopolymer with a branching degree of not less than 50 branches/1000 carbons, and can be referred to as Branched Polyethylene or Branched PE. According to a synthesis method at present, the highly branched polyethylene is mainly obtained by catalyzing ethylene homopolymerization by a late transition metal catalyst based on a chain walking mechanism, and preferably, the late transition metal catalyst may be one of (α-diimine) nickel/palladium catalysts. The essence of the chain walking mechanism means that a late transition metal catalyst, such as the (α-diimine) nickel/palladium catalyst, is easy to take a P-hydrogen elimination reaction and a reinsertion reaction in the process of catalyzing olefin polymerization, so that branched chains are generated. The branched chain based on a main chain of such highly branched polyethylene can have different carbon atom numbers, and specifically, the carbon atom number may be 1-6, or more.

The (α-diimine) nickel catalyst is obviously lower in production cost than the (α-diimine) palladium catalyst, and is more suitable for industrial application, so that the present invention preferably uses the highly branched polyethylene prepared by ethylene polymerization catalyzed by the (α-diimine) nickel catalyst.

A highly branched polyethylene raw material used in the present invention has a branching degree of not less than 50 branches/1000 carbons, and a weight average molecular weight of not less than 66 thousand; the branching degree is further preferably 60-130 branches/1000 carbons, and the weight average molecular weight is further preferably 66-518 thousand; and the branching degree is further preferably 70-120 branches/1000 carbons, and the weight average molecular weight is further preferably 82-436 thousand, and the branching degree is further preferably 82-105 branches/1000 carbons, and the weight average molecular weight is further preferably 279-365 thousand. A Mooney viscosity is preferably 6-102, and is further preferably 12-93, and is further preferably 42-80.

The α-olefin in the ethylene and α-olefin copolymer used in the present invention has 3-30 carbon atoms, and the α-olefin includes at least one of propylene, 1-butene, 1-pentene, 3-methyl-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. Specifically, the ethylene and α-olefin copolymer may be selected from at least one of an ethylene-propylene copolymer, an ethylene-butene copolymer, an ethylene-hexene copolymer and an ethylene-octene copolymer, preferably the ethylene-butene copolymer or the ethylene-octene copolymer.

The monoolefin and diene monomer binary copolymer used in the present invention is preferably an isobutylene and isoprene copolymer, and specifically may be butyl rubber.

The monoolefin and diene monomer ternary or higher copolymer used in the present invention is preferably ethylene propylene diene monomer (EPDM), and a third monomer may be specifically selected from at least one of 5-ethylidene-2-norbornene, 5-vinyl-2-norbornene, dicyclopentadiene, 1,4-hexadiene, 1,5-hexadiene, 1,4-pentadiene, 2-methyl-1,4-pentadiene, 3-methyl-1,4-hexadiene, 4-methyl-1,4-hexadiene, 1,9-decadiene, 5-methylene-2-norbornene, 5-amylidene-2-norbornene, 1,5-cyclooctadiene, 1,4-cyclooctadiene, and the like, and is preferably selected from at least one of 5-ethylidene-2-norbornene, 5-vinyl-2-norbornene, dicyclopentadiene, and 1,4-hexadiene.

In the present invention, the polar monomer for preparing P2, P3 and P4 may be selected from maleic anhydride (MAH), methacrylic acid (MA), acrylic acid (AA), itaconic acid (IA), fumaric acid (FA), isocyanate, glycidyl methacrylate (GMA), methyl methacrylate (MMA), dibutyl fumarate (DBF), P-hydroxyethyl methacrylate (HEMA), dibutyl maleate (DBM), diethyl maleate (DEM), elementary halogen (such as liquid chlorine and liquid bromine), a halogen-containing compound (such as N-bromosuccinimide, bromodimethylhydantoin, carbon-adsorbed chlorine and carbon-adsorbed bromine), a sulfur-containing compound (such as sulfur dioxide and sulfinyl chloride), vinyltrimethoxysilane (VTMS), vinyltriethoxysilane (VTES), 3-methacryloxypropyltrimethoxysilane (VMMS), styrene (St), α-methylstyrene (α-MSt), acrylonitrile (AN), and the like. A preferable technical solution is that the used polar monomer includes at least one of the above polar monomers.

According to a preparation method of P2 used in the present invention, P2 is obtained by performing a grafting reaction on the highly branched polyethylene and the polar monomer under the action of one or more of a free radical initiator, high temperature, high shearing force, high energy radiation, ultrasonic waves, and the like by a method such as a solution grafting method, a swelling grafting method, a mill warm-up grafting method, a melt grafting method, a radiation grafting method, an emulsion grafting method, a suspension grafting method, and the like. According to a conventional preparation method, P2 is obtained by performing a grafting reaction under the action of a free radical initiator by a solution method or a melt method. A solvent used in the solution grafting method includes toluene, xylene, benzene, n-hexane, cyclohexane, n-heptane, carbon tetrachloride, chlorobenzene, trichlorobenzene, and the like or a mixed solvent of the above solvents. The polar monomer used maybe one or two or more. In order to improve the grafting efficiency or inhibit side reactions such as degradation or crosslinking in the grafting reaction process, two or more multi-monomer grafting modification technologies may be adopted, for example, if styrene is used as a co-monomer, the grafting efficiency can be improved or the side reactions such as degradation or crosslinking in the grafting reaction process can be inhibited, so as to improve the grafting effect.

In the present invention, P2 may be selected from highly branched polyethylene-grafted maleic anhydride, highly branched polyethylene-grafted acrylonitrile, highly branched polyethylene-grafted styrene, halogen-containing highly branched polyethylene, and the like. From the perspective of cost, P2 is preferably the halogen-containing branched polyethylene, where a polar group includes at least one of a chlorine group, a bromine group, a chlorosulfonyl group, and a bromosulfonyl group. The polar monomer is preferably at least one of elementary halogen, a halogen-containing compound or a sulfur-containing compound, and is further preferably elementary chlorine or elementary bromine, and the halogen content is preferably 0.2%-51.3%. A reaction method is preferably to react with chlorine gas or liquid bromine under the action of a free radical initiator by a solution method to obtain chlorinated branched polyethylene or brominated branched polyethylene. The chlorine content is preferably 0.5-45.5%, or 0.5-35.6%, or 0.5-25.6%, or 1.2-10.4%, or 1.2-6.3%, or 3.1-25.6%, or 10.4-35.6%. The bromine content is preferably 0.5%-4%, is further preferably 0.8%-4%, and is further preferably 1%-3.2%. The branched polyethylene may be further sulfonated in the chlorination process, and the content of a sulfur element is preferably 0.5-2%.

Based on chlorination or bromination, further reaction with polar monomers such as maleic anhydride, acrylonitrile and styrene may be further preformed to obtain more targeted modified highly branched polyethylene.

P3 used in the present invention may be selected from halogenated ethylene-propylene copolymer, a halogenated ethylene-octene copolymer, maleic anhydride modified ethylene-propylene copolymer or a maleic anhydride modified ethylene-octene copolymer, and the like.

P4 used in the present invention may be selected from chlorinated ethylene propylene diene monomer, brominated ethylene propylene diene monomer, chlorosulfonatedethylene propylene diene monomer, maleic anhydride modified ethylene propylene diene monomer, acrylonitrile modified ethylene propylene diene monomer, chlorinated butyl rubber, brominated butyl rubber, and the like.

From the perspective of market maturity, for P3 and P4, P4 is more preferable, and chlorinated butyl rubber or brominated butyl rubber is further preferable. By using the chlorinated butyl rubber, the adhesion performance of the rubber composition can be improved, moreover, a vulcanization system for the rubber composition can be enriched, the dynamic performance, such as dynamic ozone aging resistance and damping performance can be improved, and the rubber composition is more suitable for application fields such as sidewalls, conveyor belts, and shock absorption components.

According to a further technical solution, the vulcanization system in the rubber composition of the present invention may be selected from at least one of a peroxide vulcanization system, a sulfur vulcanization system, a thiourea vulcanization system, a thiadiazole vulcanization system, a triazole dimercaptoamine salt vulcanization system, a metal oxide vulcanization system, a phenolic resin vulcanization system, an N,N'-m-phenylene bismaleimide vulcanization system, a radiation vulcanization sensitization system, and the like, and is preferably selected from at least one of the peroxide vulcanization system, the sulfur vulcanization system, the thiourea vulcanization system, the metal oxide vulcanization system, and the radiation vulcanization sensitization system.

The peroxide vulcanization system includes a peroxide crosslinking agent and an assistant crosslinking agent. According to a further technical solution, based on 100 weight parts of the rubber matrix, the amount of the peroxide crosslinking agent is 2-10 parts, and the amount of the assistant crosslinking agent is 0.2-10 parts. The peroxide crosslinking agent includes at least one of di-tert-butyl peroxide, dicumyl tert-butylcumyl peroxide, 1,1-di-tert-butyl peroxide-3,3,5-peroxide, trimethylcyclohexane, 2,5-dimethyl-2,5-di(tert-butylperoxy)hexane, 2,5-dimethyl-2,5-di(tert-butylperoxy)hexyne-3, bis(tert-butylperoxyisopropyl)benzene (BIBP), 2,5-dimethyl-2,5-di(benzoylperoxy)hexane (DBPMH), tert-butyl peroxybenzoate and tert-butylperoxy-2-ethylhexyl carbonate. The assistant crosslinking agent includes triallyl cyanurate, triallyl isocyanurate, ethylene glycol dimethacrylate, ethyl dimethacrylate, triethylenedimethacrylate, triallyl trimellitate, trimethylolpropane trimethacrylate, ethylene glycol dimethacrylate, N,N'-m-phenylene bismaleimide (HVA-2), N,N'-bis(furfurylidene)acetone, 1,2-polybutadiene, p-quinonedioxime, sulfur, and metal salts of unsaturated carboxylic acids. The metal salts of unsaturated carboxylic acids includes at least one of zinc acrylate, zinc methacrylate (ZDMA), magnesium methacrylate, calcium methacrylate, and aluminum methacrylate. By adding a proper amount of metal salts of unsaturated carboxylic acids, such as zinc methacrylate, the physical and mechanical performance, especially tensile strength of vulcanized rubber can be effectively improved. By using HVA-2 as an assistant crosslinking agent, the vulcanization speed can be accelerated, and the crosslinking density and the crosslinking network can be improved. Under the condition that halogenated butyl rubber exists in the rubber matrix, the HVA-2 may also be used as a vulcanizing agent for the halogenated butyl rubber, so that the co-vulcanization performance of P1 or P2 and the halogenated butyl rubber is favorably improved, and the comprehensive performance of the whole of a rubber material is further improved.

The sulfur vulcanization system includes sulfur and an accelerator. According to a further technical solution, based on 100 weight parts of the rubber matrix, the usage amount of the sulfur is 0.3-2 parts, and the usage amount of the accelerator is 0.5-3 parts. The accelerator may be selected from at least one of 2-mercaptobenzothiazole, dibenzothiazyl disulfide, tetramethylthiuram monosulfide, tetramethylthiuram disulfide, tetraethylthiuram disulfide, N-cyclohexyl-2-benzothiazylsulfenamide, N,N-dicyclohexyl-2-benzothiazylsulfenamide, bismaleimide, and 1,2-ethylenethiourea. Based on 100 weight parts of the rubber matrix, the sulfur vulcanization system may further include 3-6 parts of zinc oxide and 0-1 part of magnesium oxide. When the technical solution of using the peroxide vulcanization system and the sulfur vulcanization system together is adopted, the rubber matrix may also include a certain amount of ethylene propylene diene monomer to improve the co-vulcanization performance of the whole rubber composition. Specifically, 0-30 parts of the ethylene propylene diene monomer is included in every 100 weight parts of the rubber matrix.

The thiourea vulcanization system is generally composed of thiourea and a small amount of sulfur. The thiourea may be selected from ethylthiourea or ethylene thiourea. The thiourea vulcanization system can vulcanize the halogenated branched polyethylene with a higher halogen content, and a vulcanization mechanism is similar to that of conventional chlorinated polyethylene (CPE). Additionally, the thiourea vulcanization system is also applicable to vulcanization of halogenated butyl rubber, and the halogenated butyl rubber vulcanized by the thiourea has good heat resistance and high mechanical strength. Therefore, when the rubber composition of the present invention simultaneously includes the branched polyethylene with a high halogen content and the halogenated butyl rubber, a certain thiourea component included in the vulcanization system is beneficial to improvement of the co-vulcanization performance and the mechanical strength.

The thiadiazole vulcanization system and the triazole dimercaptoamine salt vulcanization system are suitable for vulcanizing the rubber composition with the higher halogen content in the rubber matrix. The thiadiazole vulcanization system consists of a crosslinking agent and an accelerator. The crosslinking agent is mainly a thiadiazole derivative biological crosslinking agent, and commonly includes ECHO.A, ECHO., TDD, PT75, TDDS., and the like. Common accelerators include Vanax 808, EataAccelDH, NC, Accel903, BF, and the like. A certain amount of an acid acceptor such as high-activity magnesium oxide or superfine magnesium hydroxide is also used. The triazole dimercaptoamine salt vulcanization system is a single substance that integrates effective groups of a thiadiazole vulcanizing agent and an accelerator (a condensate of n-butyl aldehyde and aniline), overcomes the defect of irregular distribution of cross-linked bonds after crosslinking of the rubber by the thiadiazole and the accelerator, and enables a rubber cross-linked body to have a stable structure. Compared with a thiadiazole system, the salt changes the PH value of the system from strong acidity into neutrality due to the introduction of special groups, and changes the adverse influence of an acidic filler on the system, so that the rubber has higher chemical activity during crosslinking. Therefore, the physical performance or the chemical performance of the rubber crosslinked by the system is qualitatively improved. The triazole dimercaptoamine salt vulcanization system is suitable for the low-temperature non-pressure or low-pressure vulcanization process conditions, realizes high vulcanization speed, small addition amount, no decomposition at the vulcanization temperature, no odor, environmental protection and no toxicity. Representative products are: a vulcanizing agent FSH, and a crosslinking agent TEHC.

The metal oxide vulcanization system includes zinc oxide, and further includes magnesium oxide and stearic acid. Under the condition that halogenated butyl rubber exists in the rubber matrix, the magnesium oxide has the effect of a scorch retarder, and the stearic acid has the effects of assisting the dispersion of the metal oxide and regulating the vulcanization speed.

A main component of the radiation vulcanization sensitization system is a radiation sensitizer that may be selected fromtriallyl cyanurate, triallyl isocyanurate, ethylene glycol dimethacrylate, triethylene glycol dimethacrylate, trimethylolpropane trimethacrylate, and the like. The radiation sensitization system is particularly suitable for application fields such as electric wires and cables with requirements on electrical insulation performance or medical rubber products with higher requirements on material cleanliness.

According to a further technical solution, in the rubber composition of the present invention, based on 100 weight parts of the rubber matrix, the compounding component further includes: 10-200 parts of a reinforcing filler, 0-80 parts of a plasticizer, 3-30 parts of a metal oxide, 0-3 parts of stearic acid, 0-15 parts of a surface modifier, 0-6 parts of a stabilizer, 0-5 parts of a tackifier, 0-20 parts of an adhesive, 0-150 parts of a flame retardant, 0-20 parts of a foaming agent and 0-40 parts of a gas barrier agent.

According to a further technical solution, the reinforcing filler includes at least one of carbon black, white carbon black, calcium carbonate, calcined clay, talcum powder, magnesium silicate, aluminum silicate, magnesium carbonate, titanium dioxide, montmorillonite, staple fiber, kaolin and bentonite.

According to a further technical solution, the plasticizer includes at least one of pine tar, engine oil, naphthenic oil, paraffin oil, aromatic oil, liquid 1,2-polybutadiene, liquid polyisobutylene, ethylene glycol dimethacrylate, liquid ethylene-propylene rubber, coumarone, RX-80, stearic acid, paraffin, chlorinated paraffin, dioctyl adipate, dioctyl sebacate, epoxidized soybean oil, dibutyl phthalate, dioctyl phthalate, diisodecyl phthalate, ditridecyl phthalate and trioctyltrimellitate. In order to improve the adhesiveness, a plasticizer with a tackifying effect, such as the pine tar, the coumarone, the RX-80, the liquid polyisobutylene and the ethylene glycol dimethacrylate may be preferably used. In order to improve cold resistance, the dioctyl adipate, the dioctyl sebacate, the dioctyl phthalate, and the like may be preferably used. For the halogen-containing rubber matrix, the epoxidized soybean oil has the effect of stabilizing the rubber matrix in the processing process.

According to a further technical solution, the metal oxide includes at least one of zinc oxide, magnesium oxide, aluminum oxide, lead oxide and calcium oxide. The metal oxide can assist the crosslinking and absorb hydrogen chloride or hydrogen bromide.

According to a further technical solution, the stabilizer is selected from a 2,2,4-trimethyl-1,2-dihydroquinoline polymer (RD), 6-ethoxy-2,2,4-trimethyl-1,2-dihydroquinoline (AW), 2-mercaptobenzimidazole (MB), N-phenyl-N'-cyclohexyl-p-phenylenediamine (4010), N-isopropyl-N'-phenyl-p-phenylenediamine (4010NA), N-(1,3-dimethyl) butyl-N'-phenyl-p-phenylenediamine (4020), and the like. For the rubber composition with the higher halogen content in the rubber matrix, the stabilizer may be further selected from a basic lead salt compound, a metal soap compound, an organic tin compound, an epoxy compound, a phosphite compound, a polyhydric alcohol compound, and the like. The basic lead salt compound is selected from lead stearate, dibasic lead titanate, basic lead silicate, lead phthalate, and the like.

According to a further technical solution, the flame retardant includes at least one of pentaerythritol, ammonium polyphosphate, triethyl phosphate, aluminum hydroxide, magnesium hydroxide, zinc borate, antimony trioxide, zinc stearate, titanate, decabromodiphenyl ether, hydroxide modified by a silane coupling agent, and red phosphorus. The aluminum hydroxide, the magnesium hydroxide and the hydroxide modified by the silane coupling agent are respectively nano aluminum oxide, nano magnesium hydroxide and nano hydroxide modified by the silane coupling agent. The red phosphorus is microencapsulated red phosphorus.

According to a further technical solution, the surface modifier includes at least one of polyethylene glycol, diphenyl silanediol, triethanolamine, a silane coupling agent and a titanate coupling agent.

According to a further technical solution, the adhesive includes at least one of a resorcinol donor, a methylene donor, organic cobalt salt, maleic anhydride butadiene resin and liquid natural rubber. The resorcinol donor may be selected from at least one of resorcinol (adhesive R), an adhesive RS, an adhesive RS-11, an adhesive R-80, an adhesive RL, an adhesive PF, an adhesive PE, an adhesive RK, and an adhesive RH. The methylene donor may be selected from at least one of hexamethylenetetramine (HMTA), an adhesive H-80, an adhesive A, an adhesive RA, an adhesive AB-30, an adhesive Rq, an adhesive RC, an adhesive CS963, and an adhesive CS 964. The organic cobalt salt, such as cobalt boracylatecan effectively improve the adhesive strength between the rubber composition and metal. According to a further technical solution, the adhesive may also be selected from triazine adhesives, and the specific commercial brand may be selected from at least one of an adhesive TAR, an adhesive TZ, an adhesive AIR-1 and an adhesive AIR-101, is preferably selected from at least one of the adhesive AIR-1 and the adhesive AIR-101, can partially replace the adhesive of the resorcinol donor, and has the advantages of good adhesion performance and relative environmental protection. An adhesion system and the white carbon black achieve a synergistic effect, so that good adhesion performance can be realized.

In the implementation of the present invention, in order to improve the adhesion of the rubber material, the rubber composition may further include a tackifier. In the above plasticizer, the pine tar, the coumarone resin, the RX-80 and the liquid polyisobutylene have the effect of a tackifier at the same time. The liquid coumarone resin has a better tackifying effect than the solid coumarone resin. The tackifier may also be selected from C5 petroleum resin, C9 petroleum resin, Escorez1102 resin, hydrogenated rosin, terpene resin, alkyl phenolic resin, modified alkyl phenolic resin, alkyl phenol-acetylene resin, metal salts of unsaturated carboxylic acids, and the like. Based on 100 weight parts of the rubber matrix, the amount of the tackifier is generally not more than 30 weight parts. The metal salts of unsaturated carboxylic acids such as methacrylate further has the effect of a stabilizer while improving the adhesion performance, and the high-temperature aging resistance of the rubber composition is improved.

According to a further technical solution, the foaming agent includes at least one of sodium bicarbonate, azodicarbonamide (AC), dinitronitropentyl tetramine (H), oxydibenzenesulfonyl hydrazide (OBSH), benzenesulfonyl hydrazide (BSH), urea and a microcapsule type foaming agent containing low-boiling-point hydrocarbon. The rubber composition including the foaming agent is particularly suitable for producing a light sole material with good elasticity.

According to a further technical solution, the gas barrier agent may be selected from NM360 or EVOH. By adding the gas barrier agent, the rubber composition of the present invention can be better applied to cases with the requirement on gas tightness.

The rubber composition of the present invention may exist in a form of an uncrosslinked rubber compound, and may exist in a form of a vulcanized rubber after further crosslinking reaction. The vulcanized rubber may also be referred to as vulcanizate.

The present invention further provides a processing method A of the rubber composition. The rubber matrix of the present invention belongs to a nonpolar polymer or a polarization modified substance of a nonpolar polymer, and has good compatibility, so that the following processing method may be selected. A mixing process includes the following steps:
  (1) setting a temperature of an internal mixer and a rotating speed of a rotor;
  (2) adding the rubber matrix into the internal mixer for mixing;
  (3) sequentially adding components in the compounding components except for the vulcanization system into the internal mixer according to a sequence of dry agents and liquid agents, and mixing until the power is stable;
  (4) when the temperature of the internal mixer is proper, adding components of the vulcanization system into the internal mixer for mixing, and then discharging rubber; or directly discharging rubber after the operation of step (3), and adding the vulcanization system on an open mill at a proper temperature; and
  (5) plasticating the rubber compound on an open mill to obtain a sheet, cooling, and 16-24 h standing, then performing re-mixing, and discharging sheets.

When the rubber matrix includes two or more compositions, the present invention further provides another processing method B of the rubber composition, specifically including: using a master batch method, dividing various kinds of rubber matrixes into at least two groups, making each group of rubber matrixes into mixed master batches respectively according to steps 1-3 in the method A, then, adding all of the mixed master batches into the internal mixer or the open mill together for mixing, then, adding the vulcanization system, and plasticating the rubber compound on an open mill to obtain a sheet after uniform mixing.

When the rubber matrix includes two or more compositions, the present invention further provides another processing method C of the rubber composition, specifically including: using a master batch method, dividing various kinds of rubber matrixes into at least two groups, making each group of rubber matrixes into mixed master batches respectively according to steps 1-4 in the method A, then, adding all of the mixed master batches into the internal mixer or the open mill together, and then plasticating the rubber compound on an open mill to obtain a sheet after uniform mixing.

The present invention provides a tire. At least one of rubber materials used for a sidewall and a tread of the tire includes the above rubber composition.

The tire provided by the present invention may be a radial tire, a bias-ply tire or a cycle tire. The cycle tire may be a non-motor vehicle tire such as a bicycle tire, a trolley tire, an animal-drawn vehicle tire, and an electric vehicle tire. The cycle tire may be especially and preferably a white or colored bicycle tire.

The rubber composition of the present invention can be used as sidewall rubber to manufacture a tire by a general method. That is, the rubber compound is extruded and processed according to a designed shape of the sidewall of the tire, and is formed together with other tire components by the general method on a tire forming machine to form an unvulcanized tire. The unvulcanized tire is heated and pressurized in a vulcanizer to obtain the tire.

The rubber composition of the present invention can be used as tread rubber to manufacture a tire by a general method. That is, the rubber compound is extruded and processed according to a designed shape of the tread of the tire, and is formed together with other tire components by the general method on a tire forming machine to form an unvulcanized tire. The unvulcanized tire is heated and pressurized in a vulcanizer to obtain the tire. The glass transition temperature of the branched polyethylene can be increased after a part of the polar monomer (such as styrene) is grafted, so that the wet skid resistance of the branched polyethylene when the rubber composition is used as tread rubber is favorably improved.

According to a further technical solution, the sidewall and the tread of the tire use the rubber composition provided by the present invention at the same time, and the co-vulcanization performance and the adhesion performance between the sidewall and the tread are improved, so that the overall quality of the tire is improved.

A steel wire or fiber framework used for the tire is preferably that is surface treated and can be well adhered to nonpolar rubber. The surface treatment may adopt a mode of soaking with an RFL impregnation system.

The present invention further provides a shock absorption bearing, rubber used for the shock absorption bearing including the above rubber composition. According to a further technical solution, in order to reduce the influence of creepage and stress relaxation on the performance of the rubber bearing, the usage amount of the plasticizer in the rubber composition is preferably 0-15 parts, and the plasticizer is further preferably a low-molecular-weight polymer plasticizer such as liquid polyisobutylene and liquid ethylene-propylene rubber. The shock absorption bearing may be specifically a plate type rubber bearing for bridge, a pot type rubber bearing, an engine shock absorption bearing, an automobile oil-resistant shock absorption pad, an automobile exhaust pipe shock absorption support frame, a railway sleeper pad or a building shock isolation rubber bearing, and the like. The rubber composition of the present invention has good compression set resistance, flex resistance, high-temperature resistance and ozone aging resistance performance, and can further realize good performance on damping shock absorption performance under the presence of halogenated butyl rubber.

The present invention further provides a rubber plug, rubber used for the rubber plug including the above rubber composition. The rubber plug provided by the present invention has good aging resistance, acid and alkali resistance, compression set resistance and good gas tightness. The rubber plug may be specifically used as a medical bottle plug, and a vulcanization system of the rubber plug is preferably a zinc oxide vulcanization system or a radiation crosslinking system. When the zinc oxide vulcanization system is used, a rubber matrix preferably includes halogenated butyl rubber and halogenated branched polyethylene, and is further preferably brominated butyl rubber and brominated branched polyethylene. Based on 100 weight parts of the rubber matrix, the usage amount of the brominated butyl rubber is preferably 40-50 weight parts.

The present invention further provides an inner tube, rubber used for the inner tube including the above rubber composition. The inner tube of the present invention achieves a good processing effect of an inflating valve attaching process due to good adhesion performance of the rubber.

The present invention further provides a tubeless tire, including an inner liner. Rubber used for the inner liner of the tubeless tire includes the above rubber composition.

The present invention further provides a conveyor belt, including working surface covering rubber and non-working surface covering rubber, and an adhesive layer is arranged between the said working surface covering rubber and non-working surface covering rubber. At least one layer of the working surface covering rubber and the non-working surface covering rubber and the adhesive layer of the conveyor belt includes the above rubber composition. By using the rubber composition of the present invention as the covering rubber of the conveyor belt, the adhesion performance between the covering rubber and an adhesive layer of the conveyor belt can be improved. One or more performance such as antistatic performance, flame retardance, oil resistance of the conveyor belt is improved to a certain degree.

The present invention further provides a canvas core conveyor belt. Rubber used for an adhesive layer of the canvas core conveyor belt includes the above rubber composition. The used canvas is any one of cotton canvas, vinylon canvas, nylon canvas, polyester canvas, straight warp and straight weft polyester-nylon canvas and aramid canvas. According to a further technical solution, every 100 weight parts of a rubber matrix of the rubber used for at least one layer of the working surface covering rubber and the non-working surface covering rubber of the conveyor belt includes 5-100 weight parts of branched polyethylene or modified branched polyethylene.

The present invention further provides a rope core conveyor belt. Rubber used for adhesive layer with core of the rope core conveyor belt includes the above rubber composition. A rope core used is a steel wire rope core or a polymer rope core. The polymer rope core may be selected from an aramid rope core, an ultra-high-molecular-weight polyethylene fiber rope core, and the like. According to a further technical solution, every 100 parts of a rubber matrix of rubber used for at least one layer of working surface covering rubber and non-working surface covering rubber of the conveyor belt includes 5-100 weight parts of branched polyethylene or modified branched polyethylene.

The rubber composition used for the adhesive layer of the canvas core conveyor belt or the rope core conveyor belt may further include 2-5 parts of staple fiber so as to improve the modulus and improve the overall modulus distribution of the conveyor belt. The staple fiber is preferably a kind that is surface pretreated and has good blending performance with nonpolar rubber.

The present invention further provides a conveyor belt, including cushion rubber between covering rubber and adhesive rubber. Rubber used for cushion rubber includes the above rubber composition. According to a further technical solution, every 100 parts of a rubber matrix of rubber used for at least one layer of working surface covering rubber and non-working surface covering rubber of the conveyor belt includes 5-100 weight parts of branched polyethylene or modified branched polyethylene.

The present invention further provides a single-layer rubber hose, a rubber material used for the single-layer rubber hose including the above rubber composition. The rubber hose may be selected from a water delivery rubber hose, an oil delivery rubber hose, an acid(alkali) delivery rubber hose, and the like.

The present invention further provides a rubber hose, including an inner rubber layer and an outer rubber layer. At least one of the inner rubber layer and the outer rubber layer includes the above rubber composition. The rubber hose is selected from an air conditioner rubber hose, a braking rubber hose, a steam rubber hose, a vacuum rubber hose, and the like.

The present invention further provides a rubber hose, including an inner rubber layer, a middle rubber layer and an outer rubber layer. At least one of the inner rubber layer, the middle rubber layer and the outer rubber layer includes the above rubber composition. The rubber hose may be selected from hydraulic rubber hoses such as an automobile braking rubber hose and a mine hydraulic rubber hose.

The present invention further provides a rubber hose assembly matched with the rubber hose. The rubber used for the outer rubber layer of the rubber hose assembly includes the above rubber composition.

The present invention further provides a power transmission belt, including a main body. The main body has a certain length and includes a cushion rubber layer and a compressed rubber layer. The power transmission belt is characterized in that rubber used for at least one of the cushion rubber layer and the compressed rubber layer includes the above rubber composition. The cushion rubber layer can use the same rubber matrix as the compressed rubber layer. The cushion rubber layer may include or not include the staple fiber. In order to improve the adhesion performance, the cushion rubber layer is preferably free of the staple fiber.

A load-bearing core wire in the cushion rubber layer is preferably a kind with high strength and low elongation, and may be specifically selected from polyester fiber, aramid fiber, glass fiber, ultra-high-molecular-weight polyethylene fiber, and the like. The polyester fiber may be selected from polyarylate fiber, polybutylene terephthalate fiber, polyethylene terephthalate fiber, polypropylene terephthalate fiber, polyethylene naphthalate fiber, and the like. The above load-bearing core wire is preferably adhesion treated so as to improve the adhesion performance of the load-bearing core wire and rubber. The adhesion treatment may be performed by soaking the load-bearing core wire into a treatment solution such as resorcinol-formaldehyde latex (RFL impregnation solution) and performing heating and drying.

The power transmission belt provided by the present invention further includes a reinforcing fabric. The reinforcing fabric is generally positioned at the outer side of the cushion rubber layer, and may use a plain, twill, satin weave fabric, and the like of cotton fiber, polyester fiber, aramid fiber, polyamide fiber, ultra-high-molecular-weight polyethylene fiber, and the like. A rubber canvas that is coated with the rubber composition and RFL treated is preferably used as the reinforcing fabric.

According to a further technical solution for the power transmission belt, based on 100 weight parts of a rubber matrix, the compressed rubber layer further includes 10-80 weight parts of a solid lubricant. The solid lubricant includes at least one of graphite, mica, molybdenum disulfide and polytetrafluoroethylene. The usage amount of the solid lubricant is further preferably 10-60 weight parts.

A transmission belt produced by using the rubber composition provided by the present invention as a compressed layer rubber material also includes, but is not limited to, the following types: a classical wrapped V belt, a wrapped narrow V belt, a wrapped joined belt, a wrapped agricultural belt, a hexagonal belt, a cut-edged V belt, a cut-edged narrow V belt, a cut-edged joined V belt, a cut-edge mechanical variable-speed V belt, a cut-edged industrial variable-speed V belt, a motorcycle variable-speed V belt, a poly V belt, and the like.

The power transmission belt of the present invention is not limited to the above structures. For example, a poly V belt without a cushion rubber layer, and a V belt provided with a back side rubber layer for replacing the reinforcing fabric and provided with rubber exposed to the back side of the belt are also included in the technical scope of the present invention.

The present invention further provides a synchronous belt, rubber used for the synchronous belt including the above rubber composition.

The present invention further provides a rubber roller, rubber used for the rubber roller including the above rubber composition.

The present invention further provides a cable, rubber used for at least one of a sheath layer or an insulation layer of the cable including the above rubber composition.

The present invention further provides an electric wire, rubber used for an insulation layer of the electric wire including the above rubber composition.

The present invention further provides a waterproof roll, rubber material used for the waterproof roll including the above rubber composition. The waterproof roll has good adhesion construction performance.

The present invention has the following beneficial effects:

(1) The limitation of non-polarity of the highly branched polyethylene is effectively overcome, a rubber composition with aging resistance and certain polarity is provided, and the use range of the highly branched polyethylene as an elastomer is broadened, so that the highly branched polyethylene is more suitable for cases with requirements on performance related to polarity, such as adhesion performance and oil resistance.

(2) The rubber composition of the present invention can be improved in one or more aspects of crosslinking speed, crosslinking efficiency, mechanical strength, wear resistance, gas barrier resistance, and the like according to different processing and application requirements.

DETAILED DESCRIPTION

The following provides descriptions of the present invention, but is not intended to limit the scope of the present invention. Some non-essential improvements and adjustments made to the present invention by a person of ordinary skill in the art according to the summary still fall within the protection scope of the present invention.

A branched polyethylene raw material used in embodiments is characterized in that: the branching degree is preferably 50-130 branches/1000 carbons, and the weight average molecular weight is preferably $6.6 \times 10^4 - 53.4 \times 10^4$ g/mol, the Mooney viscosity ML(1+4)125° C. is preferably 6-105. The branching degree is measured by a nuclear magnetic hydrogen spectrum, and the mole percentage content of each branch is measured by a nuclear magnetic carbon spectrum.

The branched polyethylene raw material is further preferably selected from the following table:

| Branched polyethylene serial No. | Branching degree | Methyl content/ % | Ethyl content/ % | Propyl content/ % | Butyl content/ % | Pentyl content/ % | Hexyl and longer branch content/ % | Weight average molecular weight/ten thousand | Molecular weight distribution | Mooney viscosity ML(1 + 4) 125° C. |
|---|---|---|---|---|---|---|---|---|---|---|
| PER-1 | 130 | 46.8 | 18.3 | 8.3 | 6.7 | 5.2 | 14.7 | 6.6 | 2.2 | 6 |
| PER-2 | 120 | 49.2 | 17.9 | 8.2 | 6.1 | 5.1 | 13.5 | 8.2 | 2.1 | 12 |
| PER-3 | 112 | 52.4 | 16.2 | 7.6 | 5.6 | 4.9 | 13.3 | 22.5 | 1.9 | 32 |
| PER-4 | 105 | 54.0 | 13.7 | 6.4 | 5.3 | 5.1 | 15.5 | 26.8 | 2.1 | 42 |
| PER-5 | 102 | 56.2 | 12.9 | 6.2 | 5.2 | 4.9 | 14.6 | 27.9 | 2.1 | 52 |
| PER-6 | 99 | 59.6 | 11.6 | 5.8 | 4.9 | 5.1 | 13.0 | 28.3 | 1.8 | 63 |
| PER-7 | 97 | 60.5 | 10.8 | 5.7 | 4.7 | 4.9 | 13.3 | 34.8 | 2.0 | 65 |
| PER-8 | 90 | 62.1 | 9.4 | 5.4 | 4.6 | 4.5 | 14.0 | 32.1 | 2.1 | 77 |
| PER-9 | 82 | 64.2 | 8.7 | 5.3 | 4.2 | 3.9 | 13.7 | 35.6 | 1.7 | 80 |
| PER-10 | 72 | 67.1 | 6.2 | 3.7 | 4.1 | 3.3 | 15.6 | 15.8 | 1.9 | 20 |
| PER-11 | 70 | 66.5 | 7.2 | 4.6 | 3.2 | 3.2 | 15.3 | 43.6 | 2.1 | 93 |
| PER-12 | 60 | 68.1 | 7.1 | 4.2 | 2.7 | 2.8 | 15.1 | 51.8 | 2.2 | 102 |
| PER-13 | 50 | 69.2 | 7.1 | 3.9 | 2.5 | 2.6 | 14.7 | 53.4 | 2.3 | 105 |

According to a preparation method of halogenated branched polyethylene used in the embodiment of the present invention, chlorine gas, bromine or sulfur dioxide is introduced into a carbon tetrachloride or hexane solution containing branched polyethylene and a free radical initiator (such as azobisisobutyronitrile) according to a modification measure of a conventional solution method in the art, and different reaction temperatures and time are controlled to obtain various kinds of different halogen-containing branched polyethylene.

The halogen-containing branched polyethylene used in the embodiments of the present invention is selected from the following table:

| P2 serial No. | Branched polyethylene raw material serial No | Chlorine element mass percentage/% | Bromine element mass percentage/% | Sulfur element mass percentage/% |
|---|---|---|---|---|
| P2-1 | PER-5 | 0.5 | | |
| P2-2 | PER-5 | 1.2 | | |
| P2-3 | PER-5 | 1.9 | | |
| P2-4 | PER-5 | 3.1 | | |
| P2-5 | PER-5 | 6.3 | | |
| P2-6 | PER-5 | 10.4 | | |
| P2-7 | PER-8 | | 1 | |
| P2-8 | PER-5 | | 1.5 | |
| P2-9 | PER-4 | | 1.9 | |
| P2-10 | PER-8 | | 2.1 | |
| P2-11 | PER-8 | | 3.2 | |
| P2-12 | PER-10 | 6.2 | | |
| P2-13 | PER-6 | 25.6 | | |
| P2-14 | PER-4 | 35.6 | | |
| P2-15 | PER-4 | 45.5 | | |
| P2-16 | PER-3 | 51.3 | | |
| P2-17 | PER-3 | 34.8 | | 0.9 |

The halogenated butyl rubber used in the embodiments of the present invention may be selected from the following table:

| Halogenated butyl rubber serial No. | Chlorine element mass percentage/% | Bromine element mass percentage/% | Mooney viscosity ML(1 + 8) 125° C. |
|---|---|---|---|
| CIIR-1 | 1.2 | | 38 |
| CIIR-2 | 1.2 | | 50 |
| BIIR-1 | | 2 | 32 |
| BIIR-2 | | 2 | 46 |

Ethylene propylene diene monomer grafted with maleic anhydride (EPDM-g-MAH) used in the embodiments of the present invention has a maleic anhydride grafting rate of 1%, and a Mooney viscosity ML(1+4)125° C. of 25.

POE grafted with maleic anhydride (POE-g-MAH) used in the embodiments of the present invention has a maleic anhydride grafting rate of 0.9%, and a melt index (190° C., 2.16 kg) of 2 g/10 min.

Rubber performance test method:

1. Hardness test: the test is performed by using a hardness tester according to the Chinese standard GB/T531.1-2008, and a testing temperature is room temperature.

2. Tensile strength and elongation at break performance test: the test is performed by using an electronic tensile testing machine according to the Chinese standard GB/T528-2009, a tensile speed is 500 mm/min, a test temperature is 23+/−2° C., and a sample is a type 2 dumbbell-shaped sample.

3. Tearing strength test: the test is performed by using an electronic tensile testing machine according to the Chinese standard GBAT529-2008, a tensile speed is 500 mm/min, a test temperature is 23+/−2° C., and a sample is a right angular sample.

4. Compression set test: the test is performed by using a compression set device according to the Chinese standard GBAT7759-1996, a type B sample is used, and a compression amount is 25%.

5. Mooney viscosity test: the test is performed by using a Mooney viscometer according to the Chinese standard GB/T1232.1-2000, a test temperature is set according to practical conditions, preheating is performed for 1 min, and the test is performed for 4 min.

6. Hot air accelerated aging test: the test is performed in a hot aging test box according to the Chinese standard GBAT3512-2001, and the temperature and time are set according to practical conditions.

Embodiments 1-9 and Comparative Example 1

The present invention provides a rubber composition which has good adhesive strength and can be used for rubber hoses, conveyor belts or other rubber products with adhesive layers.

Embodiments 1-9 and Comparative example 1 are given as examples of the adhesive rubber composition. Basic formulations of Embodiments 1-9 and Comparative example 1 are shown in Table 1: (the weight parts of each component used based on every 100 weight parts of a rubber matrix are shown therein)

TABLE 1

| Component | Comparative example 1 | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|---|
| P1 serial No. | PER-5 | PER-5 | | PER-5 | PER-2 | PER-7 | | PER-1 | PER-10 | PER-3 |
| P1 usage amount | 100 | 70 | | 70 | 30 | 30 | | 20 | 80 | 20 |
| P2, P3 and P4 serial No. | | P2-3 | P2-3 | CIIR-2 | P2-10 | P2-3 | P2-2 | P2-4 | EPDM-g-MAH | P2-9   BIIR-2 |
| P2, P3 and P4 usage amount | | 30 | 100 | 30 | 70 | 70 | 100 | 80 | 20 | 50   30 |
| Magnesium oxide | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Anti-aging agent MB | 2 | 2 | 2 | 2 | 2 | 2 | 2 | 2 | 2 | 2 |
| Anti-aging agent RD | 1 | 1 | 1 | 1 | 1 | 1 | 1 | 1 | 1 | 1 |
| White carbon black | 10 | 10 | 10 | 10 | 10 | 10 | 10 | 10 | 10 | 10 |
| Carbon black N330 | 30 | 30 | 30 | 30 | 30 | 30 | 30 | 30 | 30 | 30 |
| Liquid polyisobutylene | 15 | 15 | 15 | 15 | 15 | 10 | 10 | 10 | 10 | 10 |
| Coumarone resin | | | | | 5 | 5 | 5 | 5 | 5 | 5 |
| Adhesive RS/RA | | | | | 2/3 | 2/3 | 2/3 | 2/3 | 2/3 | 2/3 |
| Dicumyl peroxide | 3 | 3 | 3 | 3 | 3 | 3 | 3 | 3 | 3 | 3 |
| Sulfur | 0.3 | 0.3 | 0.3 | 0.3 | 0.3 | 0.3 | 0.3 | 0.3 | 0.3 | 0.3 |
| TAIC | 1.5 | 1.5 | 1.5 | 1 | 1.5 | 1.5 | 1.5 | 1.5 | 1.5 | 1 |
| ZDMA | 10 | 10 | 10 | 10 | 5 | 5 | 5 | 5 | 5 | 5 |
| HVA-2 | | | | 1 | | | | | | 1 |
| Calcium stearate | | | | | | | | | 1 | |

7. Volume resistivity test: the test is performed using a megger according to the Chinese standard GB/T1692-2008.

8. Oxygen index test: the test is performed according to the Chinese standard GB/T2046.2-2009.

9. Test of adhesive strength test with fabric: the adhesive strength between rubber and a canvas layer and between canvases is tested according to the Chinese standard GB 6759-86. A certain length of peeling is caused between adhesive layers of a sample by a "one-layer-at-a-time method" (method A) at a speed of 100 mm/min on a tensile machine, and the adhesive strength is calculated by using an automatically recorded peeling force curve. The adhesive strength at a high temperature is measured by the above method A on a high-temperature tensile testing machine.

10. Test of adhesive strength with plate: the test is performed according to the Chinese standard GB/T7760.

11. Gas tightness test: a gas barrier performance test is performed by using a gas tightness tester according to the Chinese standard GB7755.

The rubber compositions of Embodiments 1-9 and Comparative example 1 were processed according to the following method:

(1) Rubber mixing: The temperature of an internal mixer was set to be 70° C., and the rotating speed was set to be 40 r/min. A rubber matrix was added for prepressing and mixing for 90 s. Then, compounding components except for a vulcanization system were sequentially added into the internal mixer according to a sequence of dry agents and liquid agents for mixing until the power was stable. Finally, the vulcanization system was added. Rubber was discharged after mixing for 2 min. The rubber compound is plasticated on an open mill to obtain a sheet, and then stands for 24 h. In Embodiment 3 and Embodiment 9, zinc oxide was added along with the vulcanization system. In Embodiments 4-9, an adhesive RA was added along with the vulcanization system.

(2) Remixing was performed, and sheets were discharged and adhered to a commercial polyester canvas to prepare a sample. After standing for 20 h, the adhesive strength was tested for the sample.

Results of the performance tests of Embodiments 1-9 and Comparative example 1 are as shown in Table 2:

TABLE 2

| Performance test | Comparative example 1 | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|---|
| Test item (adhesive strength between polyester canvases) Aging conditions (150° C. × 48 h) | | | | | | | | | | |
| Adhesive strength before aging N/mm | 9.3 | 11.1 | 15.5 | 10.5 | 10.9 | 12.6 | 14.1 | 16.3 | 11.2 | 14.7 |
| Adhesive strength after aging N/mm | 7.8 | 8.6 | 11.6 | 8.2 | 8.7 | 8.9 | 10.6 | 12.1 | 7.9 | 10.8 |
| Adhesive strength at a high temperature (150° C.) N/mm | 4.6 | 5.6 | 6.7 | 5.3 | 5.8 | 5.4 | 7.0 | 7.2 | 5.3 | 6.1 |

Through comparison of Embodiments 1 and 2 and Comparative example 1, it can be seen that the adhesion performance of the rubber composition is obviously improved under the condition of the same formulation after the polarity of the rubber matrix is improved. Embodiments 3-9 also show good adhesion performance at room temperature and a high temperature and after high temperature aging. The rubber compositions of the above embodiments were suitable for cases with requirements on adhesion performance and aging resistance, such as rubber layers in conveyor belt adhesive layers and rubber hoses.

Embodiments 10-17 and Comparative Example 2

The present invention provides a rubber composition with good physical and mechanical performance, aging resistance and adhesion performance by using Embodiments 10-17 and Comparative example 2 as examples. Basic formulations of Embodiments 10-17 and Comparative example 2 are as shown in Table 3: (the weight parts of each component used based on every 100 weight parts of a rubber matrix are shown therein)

TABLE 3

| Component | Comparative example 2 | Embodiment 10 | Embodiment 11 | Embodiment 12 | Embodiment 13 | Embodiment 14 | Embodiment 15 | Embodiment 16 | Embodiment 17 |
|---|---|---|---|---|---|---|---|---|---|
| P1 serial No. | PER-5 | PER-8 | PER-5 | PER-7 | PER-12 | | PER-9 | PER-5 | PER-11 |
| P1 usage amount | 100 | 80 | 80 | 50 | 10 | | 20 | 80 | 20 |
| P2, P3 and P4 serial No. | | P2-11 | P2-3 | P2-9 | P2-8 | P2-2 | P2-6 | CIIR-1 | P2-9 | BIIR-1 |
| P2, P3 and P4 usage amount | | 20 | 20 | 50 | 90 | 100 | 80 | 20 | 50 | 30 |
| Zinc oxide | 10 | 10 | 10 | 10 | 10 | 10 | 10 | 8 | 8 |
| Magnesium oxide | 1 | 1 | 1 | 1 | 1 | 1 | 1 | 1 | 1 |
| Stearic acid | 1 | 1 | 1 | 1 | 1 | 1 | 1 | 1 | 1 |
| Carbon black N330 | 50 | 50 | 50 | 50 | 50 | 50 | 50 | 50 | 50 |
| Liquid polyisobutylene | | | 10 | | | | | | |
| Paraffin oil | 20 | 20 | 10 | 20 | 20 | 20 | 20 | 20 | 20 |
| BIBP | 3 | | 3 | | 3 | 3 | 3 | | |
| DCP | | 4 | | 4 | | | | 2.5 | 2 |
| TAIC | 1 | 1 | 1 | 1 | 1 | 1 | 1 | 1 | 1 |
| Sulfur | 0.3 | 0.3 | 0.3 | 0.3 | 0.3 | 0.3 | 0.3 | 0.3 | 0.3 |
| HVA-2 | | | | | | | | 1 | 1 |
| Anti-aging agent RD | 1 | 1 | 1 | 1 | 1 | 1 | 1 | 1 | 1 |

TABLE 3-continued

| Component | Comparative example 2 | Embodiment 10 | Embodiment 11 | Embodiment 12 | Embodiment 13 | Embodiment 14 | Embodiment 15 | Embodiment 16 | Embodiment 17 |
|---|---|---|---|---|---|---|---|---|---|
| Anti-aging agent MB | 1 | 1 | 1 | 1 | 1 | 1 | 1 | 1 | 1 |
| ZDMA | | | 15 | | | 15 | | | |
| Antimony oxide | | | | | | | 20 | | |
| Zinc borate | | | | | | | 10 | | |

The rubber compositions of Embodiments 10-15 and Comparative example 2 were mixed according to the following method:

The temperature of an internal mixer was set to be 70° C., and the rotating speed was set to be 40 r/min. A rubber matrix was added for prepressing and mixing for 90 s. Then, compounding components except for a vulcanization system were sequentially added into the internal mixer according to a sequence of dry agents and liquid agents for mixing until the power was stable. Finally, the vulcanization system was added. Rubber was discharged after mixing for 2 min. The rubber compound is plasticated on an open mill to obtain a sheet, and then stands for 24 h.

The rubber composition in Embodiment 16 was mixed according to the following method:

A master batch method was adopted for totally allocating DCP and TAIC to PER-5, and other components were firstly and respectively mixed with PER-5 and chlorinated butyl rubber. The temperature of the internal mixer was set to be 70° C., and the rotating speed was set to be 40 r/min. A rubber matrix was added to for prepressing and mixing for 90 s. Then, compounding components except for a vulcanization system were sequentially added into the internal mixer according to a sequence of dry agents and liquid agents for mixing until the power was stable. Finally, the vulcanization system was added. Zinc oxide was added along with the vulcanization system. Rubber was discharged after mixing for 2 min. Two kinds of master batches were obtained. The two kinds of master batches were proportionally added into the internal mixer again. Rubber was discharged after uniform mixing. The rubber compound is plasticated on an open mill to obtain a sheet, and then stands for 24 h.

A mixing method of Embodiment 17 adopted a master batch method. P2-9 and PER-11 were regarded as the same master batch, and other operation schemes were identical to those of Embodiment 16.

A further processing and test method of Embodiments 10-17 and Comparative example 2 is as follows:

Remixing was performed, and sheets were discharged. A tensile sample and a DIN abrasion sample were prepared according to a test standard, and the rubber composition of Embodiment 6 was used as an adhesive layer for adhering to a commercial polyester canvas to prepare a sample. After standing for 20 h, the tensile performance, wear resistance and adhesive strength were tested for the sample.

Results of the performance tests of Embodiments 10-17 and Comparative example 2 are as shown in Table 4:

TABLE 4

| Test item | Comparative example 2 | Embodiment 10 | Embodiment 11 | Embodiment 12 | Embodiment 13 | Embodiment 14 | Embodiment 15 | Embodiment 16 | Embodiment 17 |
|---|---|---|---|---|---|---|---|---|---|
| Adhesive strength between rubber and canvas at room temperature (N/mm) | 11.2 | 12.3 | 13.1 | 12.8 | 13.3 | 13.5 | 13.4 | 12.5 | 12.9 |
| Hardness (Shore A) | 63 | 65 | 67 | 63 | 67 | 66 | 66 | 62 | 65 |
| Tensile strength/Mpa | 21.1 | 25.8 | 21.3 | 26.6 | 24.8 | 25.3 | 25.8 | 19.5 | 22.4 |
| Elongation at break/% | 563 | 476 | 453 | 483 | 479 | 523 | 541 | 466 | 534 |
| DIN relative abrasion volume/mm$^3$ | 94 | 82 | 88 | 89 | 92 | 85 | 84 | 105 | 97 |
| After aging (150° C. × 70 h) | | | | | | | | | |
| Hardness | 64 | 66 | 68 | 64 | 68 | 68 | 67 | 63 | 66 |
| Tensile strength holding ratio/% | 92 | 93 | 92 | 92 | 91 | 92 | 91 | 91 | 92 |
| Elongation at break holding ratio/% | 89 | 89 | 88 | 87 | 87 | 85 | 87 | 82 | 85 |

Through comparison, it can be seen that the adhesion performance of the rubber composition is obviously improved after the polarity of the rubber matrix is improved, in some cases, the wear resistance can also be improved, and the rubber composition is suitable for being used as covering rubber of heat-resistant conveyor belts.

An oxygen index of the rubber composition of Embodiment 15 was 33.7%, it showed that both good adhesive strength and good flame retardance could be realized at a high chlorine content, and the rubber composition could be used as covering rubber of high-temperature-resistant flame-retardant conveyor belts.

Embodiments 18-19

Embodiment 18 provides a rubber composition applicable to a plate type rubber bearing for bridge. A formulation and a processing process of the rubber composition are as follows:

(1) The temperature of an internal mixer was set to be 80° C., and the rotating speed of a rotor was set to be 50 r/min. 70 parts of branched polyethylene PER-6 and 30 parts of brominated branched polyethylene P2-10 were added for prepressing and mixing for 90 s. Then, 10 parts of zinc oxide, 1 part of magnesium oxide and 1 part of stearic acid were added for mixing for 1 min. 50 parts of carbon black N330, 5 parts of paraffin oil SUNPAR2280 and 5 parts of coumarone resin were added for mixing for 3 min. Finally, 3 parts of DCP, 1 part of TAIC, 5 parts of ZDMA and 0.2 part of sulfur were added for mixing for 2 min. Then, rubber was discharged. The rubber compound is plasticated on an open mill to obtain a sheet, and then stands for 24 h.

(2) After remixing and sheet discharging, the sample preparation test was performed according to the standard.

Embodiment 19 provides a rubber composition applicable to a plate type rubber bearing for bridge. A formulation and a processing process of the rubber composition areas follows:

(1) The temperature of an internal mixer was set to be 80° C., and the rotating speed of a rotor was set to be 50 r/min. 50 parts of branched polyethylene PER-5 and 50 parts of chlorinated butyl rubber CIIR-2 were added for prepressing and mixing for 90 s. Then, 1 part of magnesium oxide and 1 part of stearic acid were added for mixing for 1 min. 50 parts of carbon black N330, 5 parts of paraffin oil SUNPAR2280 and 5 parts of coumarone resin were added for mixing for 3 min. Finally, 10 parts of zinc oxide, 3 parts of DCP, 1 part of TAIC, 1 part of HVA-2 and 0.2 part of sulfur were added for mixing for 2 min. Then, rubber was discharged. The rubber compound is plasticated on an open mill to obtain a sheet, and then stands for 24 h.

(2) After remixing and sheet discharging, the sample preparation test was performed according to the standard.

Performance data of Embodiments 18 and 19 are as shown in Table 5:

TABLE 5

| Test item | Embodiment 18 | Embodiment 19 |
| --- | --- | --- |
| Hardness (Shore A) | 63 | 63 |
| Tensile strength/Mpa | 23.9 | 20.5 |
| Elongation at break % | 448 | 461 |
| Compression set (70° C. × 22 h) | 9 | 12 |
| After aging (100° C. × 72 h) | | |
| Hardness | 64 | 63 |
| Tensile strength holding ratio/% | 93 | 95 |
| Elongation at break holding ratio/% | 89 | 91 |

TABLE 5-continued

| Test item | Embodiment 18 | Embodiment 19 |
| --- | --- | --- |
| Adhesion peeling strength with steel plate/(N/mm) | 14.6 | 14.5 |
| Adhesion peeling strength with polytetrafluoroethylene plate/(N/mm) | 12.8 | 12.3 |

From performance data, it can be seen that the rubber compositions of Embodiments 18 and 19 both can be used for manufacturing the plate type rubber bearing for bridge, and had good physical and mechanical performance, compression set resistance and adhesion performance.

Embodiment 20

A rubber composition for an inner rubber layer or a middle rubber layer of an air conditioner rubber hose. The rubber composition has good heat aging resistance, good compression set resistance, and high adhesive strength with a nylon inner lining layer. A formulation and a mixing process of the rubber composition are as follows:

(1) The temperature of an internal mixer was set to be 80° C., and the rotating speed of a rotor was set to be 40 r/min. 50 parts of branched polyethylene PER-6 and 50 parts of brominated branched polyethylene P2-10 were added for prepressing and mixing for 90 s. Then, 5 parts of zinc oxide, 1 part of magnesium oxide, 1 part of stearic acid, 3 parts of an adhesive RS, 1 part of an anti-aging agent RD and 1 part of an anti-aging agent MB were added for mixing for 90 s. Then, 30 parts of carbon black N774, 20 parts of white carbon black, 10 parts of paraffin oil SUNPAR2280, 10 parts of liquid polyisobutylene and 5 parts of coumarone resin were added for mixing for 3 min. Finally, 3 parts of DCP, 4 parts of an adhesive RA, 1 part of TAIC, 2 parts of HVA-2 and 0.2 part of sulfur were added for mixing for 2 min. Then, rubber was discharged. The rubber compound is plasticated on an open mill to obtain a sheet, and then stands for 24 h.

(2) Remixing was performed, and sheets were discharged. The sample preparation test was performed according to the test standard.

Results of the performance tests are as follows:

Before aging:

Shore A hardness: 70. Tensile strength: 22.8 MPa. Elongation at break: 392%.

Compression set (120° C.×96 h, type B sample): 14.8%

Adhesive strength with nylon: 6.1 N/mm.

After 150° C.×72 h hot air aging:

Shore A hardness: 72. Tensile strength holding ratio: 91%. Elongation at break holding ratio: 86%.

Embodiments 21-27 and Comparative Example 3

The present invention provides a rubber composition with good gas barrier performance, with Embodiments 21-27 and Comparative example 3 as examples. Basic formulations of Embodiments 21-27 and Comparative example 3 are as shown in Table 6: (the weight parts of each component used based on every 100 weight parts of a rubber matrix are shown therein)

TABLE 6

| Component | Comparative example3 | Embodiment 21 | Embodiment 22 | Embodiment 23 | Embodiment 24 | Embodiment 25 | Embodiment 26 | Embodiment 27 |
|---|---|---|---|---|---|---|---|---|
| Plserial No. | PER-5 | PER-5 | | | | PER-4 | | |
| P1 usage amount | 100 | 50 | | | | 20 | | |
| P2serial No. | | P2-9 | P2-9 | P2-17 | P2-5 | P2-9 | P2-14 | P2-13 |
| P2 usage amount | | 50 | 100 | 100 | 100 | 30 | 70 | 50 |
| P4 serial No. | | | | | | BIIR-2 | CIIR-2 | CIIR-1 |
| P4 usage amount | | | | | | 50 | 30 | 50 |
| Magnesium oxide | 1 | 1 | 1 | 6 | 1 | 1 | 3 | 3 |
| Zinc oxide | 5 | 5 | 5 | | 5 | 5 | 3 | 3 |
| Stearic acid | 1 | 1 | 1 | 1 | 1 | 1 | 1 | 1 |
| Calcium stearate | | | | 2 | 1 | 1 | 1 | 1 |
| Escorez1102 | | | | 6 | 6 | 6 | | 6 |
| Carbon black N660 | 55 | 55 | 55 | 55 | 55 | 55 | 55 | 55 |
| Sunpar2280 | 5 | 5 | 5 | 5 | 5 | 5 | 5 | 5 |
| DCP | 2.7 | 2.7 | 2.7 | 2.7 | 2.7 | 1.8 | 2 | 1.8 |
| Sulfur | 0.3 | 0.3 | 0.3 | 0.3 | 0.3 | 0.5 | 0.4 | 0.5 |
| TAIC | 1 | 1 | 1 | 1 | 1 | 1 | 1 | 1 |
| HVA-2 | 1 | 1 | 1 | 1 | 1 | 1 | 1 | 1 |
| AcceleratorDM | | | | | | 0.8 | 0.5 | 0.8 |
| Gas barrier agent NM360 | | | | 20 | | | 10 | 10 |

A mixing process of Embodiments 21-24 and Comparative example 3 is as follows:

(1) The temperature of an internal mixer was set to be 80° C., and the rotating speed of a rotor was set to be 40 r/min. A rubber matrix was added for prepressing and mixing for 90 s. Then, compounding components except for a vulcanization system were sequentially added into the internal mixer according to a sequence of dry agents and liquid agents for mixing until the power was stable. Finally, DCP, TAIC, HVA-2 and sulfur were added. Rubber was discharged after mixing for 2 min. The rubber compound is plasticated on an open mill to obtain a sheet, and then stands for 24 h.

(2) Remixing was performed, and sheets were discharged. The sample preparation test was performed according to the test standard.

A mixing process of Embodiments 25-27 is as follows:

(1) The temperature of an internal mixer was set to be 80° C., and the rotating speed of a rotor was set to be 40 r/min. A rubber matrix was added for prepressing and mixing for 90 s. Then, compounding components except for a vulcanization system were sequentially added into the internal mixer according to a sequence of dry agents and liquid agents for mixing until the power was stable. Finally, zinc oxide, DCP, TAIC, HVA-2 and sulfur were added. Rubber was discharged after mixing for 2 min. The rubber compound is plasticated on an open mill to obtain a sheet, and then stands for 24 h.

(2) Remixing was performed, and sheets were discharged. The sample preparation test was performed according to the test standard.

Results of gas tightness tests are as shown in Table 7:

TABLE 7

| Test item | Comparative example 3 | Embodiment 21 | Embodiment 22 | Embodiment 23 | Embodiment 24 | Embodiment 25 | Embodiment 26 | Embodiment 27 |
|---|---|---|---|---|---|---|---|---|
| Gas permeability coefficient/ ($10^{-17} \times$ m$^2 \times$ (s · Pa))(25° C., nitrogengas) | 1.11 | 1.02 | 0.95 | 0.27 | 0.61 | 0.42 | 0.29 | 0.31 |

Through comparison of Embodiments 21-27 and Comparative example 3, it can be seen that the gas barrier performance of the rubber composition can be effectively improved by properly improving the polarity of the branched polyethylene and (or) using the halogenated butyl rubber, so that the rubber composition is more suitable for cases with requirements on gas tightness, and the gas permeability coefficient of the rubber compositions in Embodiments 23 and 26 is equivalent to that of a common tire inner liner. Additionally, through polarization modification on the branched polyethylene and/or use of the halogenated butyl rubber, the adhesion capacity of the rubber composition can also be improved, the adhesive strength of the rubber composition with rubber of an inflating valve or a tire body was improved, so that the rubber composition is more suitable for application cases such as inner tubes or tire inner liners.

Embodiment 28

Provided is an inner tube, using the rubber composition of Embodiment 26. A production process of the inner tube is as follows:

(1) Rubber mixing: The temperature of an internal mixer was set to be 80° C., and the rotating speed of a rotor was set to be 40 r/min. A rubber matrix was added for prepressing and mixing for 90 s. Then, compounding components except for a vulcanization system were sequentially added into the internal mixer according to a sequence of dry agents and liquid agents for mixing until the power was stable. Finally, zinc oxide, DCP, TAIC, HVA-2 and sulfur were added. Rubber was discharged after mixing for 2 min. After rubber filtering, the rubber is plasticated on an open mill to obtain a sheet, and then stands for 24 h.

(2) Extrusion: The temperature of an extruding machine was set to be 85° C., the die temperature was set to be 115° C., and the speed of a conveyor belt was matched with the extrusion speed. An inflating valve was installed.

(3) Joint connection: Joint connection was performed by using a splicing machine, and then standing was performed.

(4) Inflation shaping and vulcanization: The inflation was performed to 70% in the first time, and was stopped for 15 s. The inflation was performed to a shaping size in the second time. The vulcanization temperature was 180° C., the steam pressure was 0.9 MPa, and the vulcanization time was 8 min. After the vulcanization was completed, the inner tube was taken out and cooled.

(5) Checking and deflashing were performed to obtain the inner tube finished product.

Embodiment 29

Provided is a tire. The formulation of rubber of an inner liner of the tire used the rubber composition of Embodiment 27.

Embodiment 30

Provided is medical rubber material, using a sulfur-free vulcanization formulation. A specific processing process of the medical rubber material is as follows:

(1) Mixing: The temperature of an internal mixer was set to be 80° C., and the rotating speed of a rotor was set to be 50 r/min. 50 parts of P2-9 and 50 parts of BIIR-1 were added for prepressing and mixing for 90 s. Then, 2 parts of low-molecular-weight polyethylene AC-617 and 80 parts of calcined clay were added for mixing for 3 min. Finally, 5 parts of active zinc oxide and 0.5 part of zinc dimethyldithiocarbamate were added. Rubber was discharged after mixing for 2 min. The rubber compound is plasticated on an open mill with a roller temperature of 60° C. to obtain a sheet, and then stands for 20 h. The rubber compound was open milled and sheet pressed on the open mill, and then standing was performed for use.

(2) Calendering: the rubber compound was calendered and pre-formed on a calendar, and then cooled.

(3) Vulcanization: The calendered rubber material was put into a mold for molding vulcanization, the temperature was 180° C., the pressure was 15 MPa, the time was 10 min, and demolding and cooling were performed after preset vulcanization time was reached.

(4) Post treatment: Trimming, and cleaning and silicification were performed to obtain a finished product, which was packaged and warehoused.

Embodiment 31

A medical rubber material using a sulfur-free and zinc-free formulation and radiation vulcanization method. A specific processing process is as follows:

(1) Mixing: The temperature of an internal mixer was set to be 80° C., and the rotating speed of a rotor was set to be 50 r/min. 70 parts of P2-9 and 30 parts of BIIR-1 were added for prepressing and mixing for 90 s. Then, 1 part of stearic acid and 80 parts of talcum powder were added for mixing for 3 min. Finally, 4 parts of a radiation sensitizer of trimethylolpropane trimethacrylate were added. Rubber was discharged after mixing for 2 min. The rubber compound is plasticated on an open mill with a roller temperature of 60° C. to obtain a sheet, and then stands for 20 h. The rubber compound was open milled and sheet pressed on the open mill, and then standing was performed for use.

(2) Vulcanization: The rubber material after remixing was put into a mold and prepressed. Then, demolding was performed for electronic beam radiation vulcanization. The energy of electronic beams for radiation was 1.0 MeV, the beam intensity was 1.0 mA, and the radiation dose was 100 kGy.

The rubber composition of the present embodiment can be used in cases with requirements of heat resistance, ozone resistance, good gas tightness and low extract content, such as medical rubber plug.

Embodiment 32

A mixing process of a rubber composition for an insulation layer of an electric wire or a cable. The process is as follows:

The temperature of an internal mixer was set to be 80° C., and the rotating speed of a rotor was set to be 50 r/min. 100 parts of brominated branched polyethylene P2-7 were added for prepressing and mixing for 90 s. 5 parts of zinc oxide, 1 part of magnesium oxide and 2 part of calcium stearate were added for mixing for 30 s. Then, 100 parts of calcined clay, 2 parts of vinyl tri-(2-methoxyethoxy) silane and 10 parts of paraffin oil SUNPAR2280 were added into the rubber material for mixing for 3 min. Finally, 6 parts of a radiation sensitizer of trimethylolpropane trimethacrylate were added. Rubber was discharged after mixing for 2 min. The rubber compound was extruded out from a cold feed extruding machine. After testing by using an electrical discharge machine at high pressure, the wire was collected. Then, radiation crosslinking was performed once. The energy of electronic beams for radiation was 1.0 MeV, the beam intensity was 1.0 mA, and the radiation dose was 80 kGy. A finished product was obtained after inspection.

The hardness of an insulation layer rubber material sample was 72, the tensile strength was 15.3 MPa, the elongation at break was 391%, and the volume resistivity was $2.3 \times 10^{16}$ Ω·cm.

The bond energy of a C—Br bond is much lower than the bond energy of a C—C bond, so that a free radial can be more easily generated under radiation. Therefore, a better crosslinking effect can be obtained at a lower radiation dose, the production efficiency is effectively improved, and the production energy amount is reduced.

Embodiment 33 and Comparative Example 4

A formulation and a processing process of Embodiment 33 are as follows:

(1) The temperature of an internal mixer was set to be 80° C., and the rotating speed of a rotor was set to be 50 r/min. 100 parts of chlorinated branched polyethylene P2-1 were added for prepressing and mixing for 90 s. 5 parts of zinc oxide, 1 part of stearic acid and 2 parts of an anti-aging agent RD were added for mixing for 30 s. Then, 120 parts of talcum powder and 30 parts of paraffin oil SUNPAR2280 were added into the rubber material for mixing for 3 min. Finally, 3 parts of DCP and 1 part of TAIC were added. Rubber was discharged after mixing for 2 min. The rubber compound is plasticated on an open mill with a roller temperature of 60° C. to obtain a sheet. Standing was performed for 20 h.

(2) Remixing was performed, and sheets were discharged. A vulcanization curve and other performance data were determined at 175° C.

A formulation and a processing process of Comparative example 4 are as follows:

(1) The temperature of an internal mixer was set to be 80° C., and the rotating speed of a rotor was set to be 50 r/min. 100 parts of branched polyethylene PER-5 were added for prepressing and mixing for 90 s. 5 parts of zinc oxide, 1 part of stearic acid and 2 parts of an anti-aging agent RD were added for mixing for 30 s. Then, 120 parts of talcum powder and 30 parts of paraffin oil SUNPAR2280 were added into the rubber material for mixing for 3 min. Finally, 3 parts of DCP and 1 part of TAIC were added. Rubber was discharged after mixing for 2 min. The rubber compound is plasticated on an open mill with a roller temperature of 60° ° C. to obtain a sheet. Standing was performed for 20 h.

(2) Remixing was performed, and sheets were discharged. A vulcanization curve and other performance data were determined at 175° C.

The test performance data of Embodiment 33 and Comparative example 4 is as shown in the table below:

| Test item | Embodiment 33 | Comparative example 4 |
| --- | --- | --- |
| Tc90/min | 4.2 | 5.5 |
| Hardness (Shore A) | 64 | 63 |
| Tensile strength/MPa | 8.5 | 7.8 |
| Elongation at break % | 592 | 687 |
| Volume resistivity/(Ω · cm) | $9.5 \times 10^{15}$ | $2.8 \times 10^{16}$ |

The crosslinking speed of Embodiment 33 including the brominated branched polyethylene was obviously higher than that of Comparative example 4, the production efficiency can be effectively improved, and the production cost can be reduced. Additionally, good mechanical strength was realized. Although the electric insulation performance is a little low, the insulation requirement of a conventional medium-low-voltage electric wire or cable can be met.

Embodiment 34

Production and processing steps of a rubber roller are as follows:

(1) Mixing: The temperature of an internal mixer was set to be 90° C., and the rotating speed of a rotor was set to be 40 r/min. 50 parts of branched polyethylene PER-7 and 50 parts of chlorinated branched polyethylene P2-12 were added for prepressing and mixing for 90 s. 5 parts of zinc oxide and 1 part of stearic acid were added for mixing for 1 min. 80 parts of carbon black N330 and 40 parts of paraffin oil SUNPAR2280 were added for mixing for 3 min. Finally, 3 parts of DCP and 2 parts of TAIC were added. Rubber was discharged after mixing for 2 min. The rubber compound is plasticated on an open mill to obtain a sheet, and then stands for 24 h.

(2) Winding and rubber coating: The rubber compound was added into a screw extruding machine to extrude rubber sheets with the thickness and width required by the process. After the rubber sheets were uniform and consistent, a rotary covering machine was started to wind the rubber sheets onto a prepared metal roller core. Layer-by-layer winding and rubber coating was performed until the rubber coating single-edge thickness reached a specified thickness. Then, 2-3 layers of nylon water cloth were wound onto the rubber surface to obtain a rubber coated rubber roller.

(3) Vulcanization in a vulcanization tank: the rubber coated rubber roller was fed into the vulcanization tank for steam vulcanization according to a set temperature control program, and the rubber coated rubber roller was taken out from the vulcanization tank after the steam vulcanization is finished.

(4) The vulcanized rubber roller was roughly processed on a lathe and was then finely processed on a grinding machine, inspection was performed, and a finished product was obtained.

The rubber composition used for the rubber roller had good physical and mechanical performance, the tensile strength was 19.6 MPa, the elongation at break was 438%, and the compression set performance (100° C.×22 h, type B sample) was 11%. Oil resistance and antistatic performance were better than that of the technical solution of fully using the branched polyethylene for the rubber matrix.

Embodiment 35

Processing steps of a shock absorption bearing for a vehicle are as follows:

(1) Mixing and forming of a rubber part: The temperature of an internal mixer was set to be 80° C., and the rotating speed of a rotor was set to be 40 r/min. 60 parts of P2-2 and 40 parts of CIIR-2 were added for prepressing and mixing for 90 s. Then, 1 part of magnesium oxide, 1 part of an anti-aging agent RD and 1 part of stearic acid were added for mixing for 1 min. 80 parts of carbon black N550 and 40 parts of paraffin oil SUNPAR2280 were added for mixing for 3 min. Finally, 3 parts of DCP, 3 parts of zinc oxide, 1 part of HVA-2, 0.5 part of tetramethylthiuram disulfide (TMTD) and 0.3 part of sulfur were added. Rubber was discharged after mixing for 2 min. Standing and inspection, remixing and sheet discharging, and weighing and forming were performed.

(2) Vulcanization process: The rubber material was adhered and formed with a metal part that is surface treated and coated with an adhesive according to process requirements. Then, the part was charged into a preheated mold and then entered a plate vulcanizing machine for vulcanization. The vulcanization temperature was 165° C., the steam pressure was 0.6 MPa, and the time was 25 min.

(3) Trimming treatment and inspection were performed to obtain a finished product.

The shock absorption bearing of the present embodiment can be used for high-temperature positions such as an engine and an exhaust pipe, and has good high-temperature resistance, compression set resistance and damping performance.

Embodiment 36

Processing steps of a waterproof roll are as follows:

(1) Mixing: The temperature of an internal mixer was set to be 90° C., and the rotating speed of a rotor was set to be 40 r/min. 20 parts of branched polyethylene PER-13, 30 parts of POE-g-MAH, and 50 parts of P2-12 were added for prepressing and mixing for 90 s. Then, 8 parts of zinc oxide, 5 parts of magnesium oxide and 1 part of stearic acid were added for mixing for 1 min. 80 parts of carbon black N550, 50 parts of paraffin oil SUNPAR2280 and 5 parts of coumarone resin were added for mixing for 3 min. Finally, 3 parts of BIBP, 1 part of TAIC, 1 part of HVA-2 and 0.3 part of sulfur were added. Rubber was discharged after mixing for 2 min. A blocky rubber material was added into an open mill for mixing. The roller temperature was controlled to be in a range of 85-95° C., the roller distance was controlled to be smaller than 1 mm, and thin passing was performed at least four times until the surface of the rubber material was smooth, uniform and glossy. Then, further mixing was performed. Thin passing was performed for at least four times. The roller distance was regulated to not exceed 8 mm. Mixing was performed three times to obtain uniformly mixed rubber material rough sheets with the thickness 8 mm or below. The sheets were cooled to a temperature 50° C. or below and discharged and stacked.

(2) Mill warm-up: The uniformly mixed rubber material rough sheets were subjected to mill warm-up on an open mill, the roller temperature was controlled in a range of 85-95° C., the roller distance was smaller than 6 mm, and a roll was primarily formed until the rubber material sheets were smooth and uniform.

(3) Calendering: The rubber material sheets primarily formed into a roll through mill warm-up were placed onto a calender, the roller distance was regulated according to the thickness requirement of a finished product for calendering, and a semi-finished product roll conforming to the thickness specification requirement of the finished product was obtained.

(4) Rolling: According to the specification length requirements of a finished product roll, an isolation lining layer was clamped, and the semi-finished product roll was rolled.

(5) Vulcanization: The rolled roll was put into a nitrogen-filled vulcanization kettle for vulcanization treatment, the temperature of the vulcanization kettle was controlled to be in a range of 155-165° C., the pressure was in a range of 20-25 MPa, and vulcanization time was in a range of 25-30 min.

(6) Rerolling: The vulcanized roll was unrolled, the isolation lining layer was taken out, and then, the vulcanized roll was rerolled and packaged to obtain a product.

The rubber composition used for the waterproof roll has good physical and mechanical performance and construction adhesion performance, and has a Shore A hardness of 65, a tensile strength of 16.3 MPa, an elongation at break of 488%, and a tearing strength of 47 kN/m.

Embodiment 37

Provided is a high-temperature-resistant poly V belt, and a compression layer and a cushion layer of the high-temperature-resistant poly V belt uses the rubber composition provided by the present invention. The production and processing steps are as follows:
1. Mixing:
(1) Compression layer rubber material mixing: The temperature of an internal mixer was set to be 90° C., and the rotating speed of a rotor was set to be 50 r/min. 100 parts of P2-10 were added for pressing and mixing for 90 s. 6 parts of zinc oxide, 2 parts of magnesium oxide, 1 part of stearic acid, 1 part of an anti-aging agent RD and 1 part of an anti-aging agent MB were added for mixing for 1 min. Then, 45 parts of carbon black N330, 5 parts of paraffin oil SUNPAR2280 and 5 parts of coumarone resin were added for mixing for 3 min. Next, 25 parts of pretreated nylon 66 staple fiber with a length of 1 mm were added for mixing for 2 min. Finally, 4 parts of a crosslinking agent DCP and 1.5 parts of TAIC were added. Rubber was discharged after mixing for 2 min. The rubber compound was thin passed on an open mill at a roller temperature of 80° C. The thin passing was performed 7 times at a roller distance of 0.5 mm, so that the staple fiber was sufficiently oriented. The roller distance was amplified to obtain thin sheets with a thickness about 2.5 mm for batch-out, and standing was performed for 20 h.

(2) Cushion layer rubber material mixing: The temperature of an internal mixer was set to be 90° C., and the rotating speed of a rotor was set to be 40 r/min. 100 parts of P2-10 was added for pressing and mixing for 90 s. Then, 6 parts of zinc oxide, 2 parts of magnesium oxide, 1 part of stearic acid, 1 part of an anti-aging agent RD and 1 part of an anti-aging agent MB were added for mixing for 1 min. 55 parts of carbon black N330, 5 parts of paraffin oil SUNPAR2280 and 5 parts of coumarone resin were added for mixing for 3 min. Finally, 4 parts of DCP, 1.5 parts of TAIC, 10 parts of zinc methacrylate and 0.3 part of sulfur were added. Rubber was discharged after mixing for 2 min.

2. Forming: A reverse forming method was used. Firstly, a plain mold was hung on a forming machine, cleaned, and coated with a small amount of insulator. After volatilization, poly V belt top cloth was coated and adhered onto the plain mold. Then, cushion rubber was coated and adhered. The tensile force of an aramid wire rope was corrected. After the flat winding of a strength layer, the cushion rubber was coated and adhered. Finally, V rubber was coated and adhered to reach the outer perimeter required by the forming process to obtain a belt blank.

3. Vulcanization: The belt blank was fed into a vulcanization section for vulcanization. The vulcanization temperature was 160° C., the inner pressure was 0.45-0.55 MPa, the outer pressure was 1.0-1.2 MPa, and the vulcanization time was 30 min.

4. Post treatment: After the vulcanization was completed, cooling and demolding were performed. A belt tube was conveyed to a cutting work procedure and cut according to a required width. After back grinding, V shape grinding and trimming, inspection was performed to obtain a finished product.

Compared with a transmission belt using branched polyethylene as a matrix, the transmission belt manufactured by using the rubber composition of the present invention has improved oil resistance, and can be better applicable to cases with slight requirements on oil resistance.

Embodiment 38

Provided is a cycle tire, and processing steps of sidewall rubber of the cycle tire are as follows:

(1) Rubber mixing: The temperature of an internal mixer was set to be 80° C., and the rotating speed of a rotor was set to be 50 r/min. 60 parts of P2-3 and 40 parts of CIIR-1 were added for pressing and mixing for 90 s. Then, 3 parts of zinc oxide, 1 part of stearic acid, 2 parts of polyethylene glycol PEG4000 and 2 parts of vinyl tri-(2-methoxyethoxy)

silane (A-172) were added for mixing for 2 min. Then, 30 parts of high-dispersity white carbon black, 30 parts of calcium carbonate, 5 parts of coumarone resin and 10 parts of paraffin oil SUNPAR2280 were added for mixing for 3 min. Next, 4 parts of DCP, 1.5 parts of an assistant crosslinking agent N,N'-m-phenylene bismaleimide (HVA-2) and 0.3 part of an assistant crosslinking agent sulfur were added. Rubber was discharged after mixing for 2 min. After plasticating on an open mill to obtain a sheet, standing and detection were performed.

(2) Extrusion molding: The rubber compound qualified through detection was extrusion molded through an extruding machine to obtain a rubber part in a shape of a sidewall for use.

Although the preferred implementations of the present invention are described in this specification, these implementations are provided only as examples. It should be understood that variants of the implementations of the present invention described in this specification may also be used for implementing the present invention. A person of ordinary skill in the art should understand that various variants, changes and replacements may be implemented without departing from the scope of the present invention. It should be understood that the protection scope of each aspect of the present invention is determined by the claims, and a method and a structure in the claims and an equivalent method and structure thereof both fall within the scope of the claims.

What is claimed is:

1. A rubber composition, comprising a rubber matrix and a compounding component, wherein in parts by weight, every 100 parts of said rubber matrix comprise:
    0-99 parts of polyethylene P1;
    0-100 parts of P2, which is a reactant of the polyethylene P1 and a polar monomer;
    0-50 parts of P3, which is a reactant of a copolymer of ethylene and α-olefin and a polar monomer; and
    0-50 parts of P4, which is a reactant of a binary, ternary or higher multipolymer of mono-olefin and diene monomer and a polar monomer;
    wherein the sum of the contents of P1 and P2 is 50-100 parts;
    wherein said compounding component comprises a vulcanization system; and
    wherein said P1 is an ethylene homopolymer with a branched structure and has a branching degree of from 50 to 102 branches/1000 carbons.

2. The rubber composition according to claim 1, wherein the ethylene homopolymer has a branching degree of from 50 to 99 branches/1000 carbons.

3. The rubber composition according to claim 2, wherein the ethylene homopolymer has a branching degree of from 50 to 97 branches/1000 carbons.

4. The rubber composition according to claim 3, wherein the ethylene homopolymer has a branching degree of from 50 to 90 branches/1000 carbons.

5. The rubber composition according to claim 4, wherein said P1 has a weight-average molecular weight of 66-518 thousand, and a Mooney viscosity ML(1+4125°) C of 6-102.

6. The rubber composition according to claim 1, wherein said polar monomer for preparing P2, P3 and P4 comprises at least one of maleic anhydride (MAH), methacrylic acid (MA), acrylic acid (AA), itaconic acid (IA), fumaric acid (FA), isocyanate, glycidyl methacrylate (GMA), methyl methacrylate (MMA), dibutyl fumarate (DBF), P-hydroxyethyl methacrylate (HEMA), dibutyl maleate (DBM), diethyl maleate (DEM), elementary halogen, a halogen-containing compound, a sulfur-containing compound, vinyltrimethoxysilane (VTMS), vinyltriethoxysilane (VTES), 3-methacryloxypropyltrimethoxysilane (VMMS), styrene (St), α-methylstyrene (α-MSt) and acrylonitrile (AN).

7. The rubber composition according to claim 6, wherein said P2 is a halogen-containing branched polyethylene with a polar group which comprises at least one of a chlorine group, a bromine group, a chlorosulfonyl group, and a bromosulfonyl group; and P4 is at least one of chlorinated butyl rubber, brominated butyl rubber, chlorinated ethylene propylene rubber, brominated ethylene propylene rubber and halogen-sulfonated ethylene propylene rubber.

8. The rubber composition according to claim 7, wherein said mass percentage of halogen in said halogen-containing branched polyethylene is 0.2%-51.3%, and said halogen-containing branched polyethylene comprises at least one of chlorinated branched polyethylene and brominated branched polyethylene.

9. The rubber composition according to claim 8, wherein said halogen-containing branched polyethylene is chlorinated branched polyethylene, and the mass percentage of chlorine in said chlorinated branched polyethylene is 0.5%-45.5%.

10. The rubber composition according to claim 8, wherein said halogen-containing branched polyethylene is brominated branched polyethylene, and the mass percentage of bromine in the brominated branched polyethylene is 0.8%-4%.

11. The rubber composition according to claim 1, wherein said vulcanization system is selected from at least one of a peroxide vulcanization system, a sulfur vulcanization system, a thiourea vulcanization system, a metal oxide vulcanization system, and a radiation vulcanization sensitization system.

12. The rubber composition according to claim 1, wherein based on 100 weight parts of said rubber matrix, said compounding component further comprises 10-200 parts of a reinforcing filler, 0-80 parts of a plasticizer, 3-30 parts of a metal oxide, 0-3 parts of a stearic acid, 0-15 parts of a surface modifier, 0-6 parts of a stabilizer, 0-5 parts of a tackifier, 0-20 parts of an adhesive, 0-150 parts of a flame retardant, 0-20 parts of a foaming agent and 0-30 parts of a gas barrier agent.

13. A tubeless tire, comprising an inner liner, a sidewall and a tread, wherein at least one of the rubbers used for said inner liner, said sidewall and said tread comprises a rubber composition, comprising a rubber matrix and a compounding component, wherein in parts by weight, every 100 parts of said rubber matrix comprise:
    0-99 parts of polyethylene P1;
    0-100 parts of P2, which is a reactant of the polyethylene P1 and a polar monomer;
    0-50 parts of P3, which is a reactant of a copolymer of ethylene and α-olefin and a polar monomer; and
    0-50 parts of P4, which is a reactant of a binary, ternary or higher multipolymer of mono-olefin and diene monomer and a polar monomer;
    and the sum of the contents of P1 and P2 is 50-100 parts;
    and said compounding component comprises a vulcanization system.

14. A conveyor belt, comprising including working surface covering rubber and non-working surface covering rubber, and an adhesive layer is arranged between said working surface covering rubber and non-working surface covering rubber, wherein the rubber used for at least one layer of said working surface covering rubber and non-working surface covering rubber and the adhesive layer comprises a rubber composition, comprising a rubber matrix and a compounding component, wherein in parts by weight, every 100 parts of said rubber matrix comprise:

0-99 parts of polyethylene P1;
0-100 parts of P2, which is a reactant of the polyethylene P1 and a polar monomer;
0-50 parts of P3, which is a reactant of a copolymer of ethylene and α-olefin and a polar monomer; and
0-50 parts of P4, which is a reactant of a binary, ternary or higher multipolymer of mono-olefin and diene monomer and a polar monomer;
and the sum of the contents of P1 and P2 is 50-100 parts;
and said compounding component comprises a vulcanization system.

15. The conveyor belt according to claim 14 is a rope core conveyor belt, wherein the rubber used for the adhesive layer with rope core of said rope core conveyor belt comprises said rubber composition according to claim 1, and said rope core is a steel wire rope core or a polymer rope core.

16. A rubber hose, comprising an inner rubber layer, a middle rubber layer and an outer rubber layer from inside to outside, wherein the rubber used for at least one of said inner rubber layer, said middle rubber layer and said outer rubber layer comprises said rubber composition according to claim 1.

17. The rubber composition according to claim 1, wherein the ethylene homopolymer has a branching degree of from 50 to 82 branches/1000 carbons.

18. The rubber composition according to claim 1, wherein the ethylene homopolymer has a branching degree of from 50 to 72 branches/1000 carbons.

19. The rubber composition according to claim 1, wherein the ethylene homopolymer has a branching degree of from 50 to 70 branches/1000 carbons.

20. The rubber composition according to claim 1, wherein the ethylene homopolymer has a branching degree of from 60 to 70 branches/1000 carbons.

* * * * *